(12) United States Patent
Boonekamp

(10) Patent No.: US 11,550,081 B2
(45) Date of Patent: Jan. 10, 2023

(54) OPTICAL SYSTEM AND LIGHTING DEVICE

(71) Applicant: SIGNIFY HOLDING B.V., Eindhoven (NL)

(72) Inventor: Erik Paul Boonekamp, Bunnik (NL)

(73) Assignee: Signify Holding B.V., Eindhoven (NL)

( * ) Notice: Subject to any disclaimer, the term of this patent is extended or adjusted under 35 U.S.C. 154(b) by 0 days.

(21) Appl. No.: 17/422,403

(22) PCT Filed: Jan. 7, 2020

(86) PCT No.: PCT/EP2020/050159
§ 371 (c)(1),
(2) Date: Jul. 12, 2021

(87) PCT Pub. No.: WO2020/148107
PCT Pub. Date: Jul. 23, 2020

(65) Prior Publication Data
US 2022/0120939 A1  Apr. 21, 2022

(30) Foreign Application Priority Data
Jan. 15, 2019 (EP) ..................................... 19151787

(51) Int. Cl.
*G02B 3/00* (2006.01)
*F21V 5/00* (2018.01)
(Continued)

(52) U.S. Cl.
CPC ............ *G02B 3/0068* (2013.01); *F21V 5/004* (2013.01); *F21V 7/0091* (2013.01); *F21Y 2105/10* (2016.08); *F21Y 2115/10* (2016.08)

(58) Field of Classification Search
CPC ..... G02B 3/0068; F21V 5/004; F21V 7/0091; F21Y 2105/10; F21Y 2115/10
See application file for complete search history.

(56) References Cited

U.S. PATENT DOCUMENTS

2008/0002423 A1  1/2008 Minano et al.
2010/0284201 A1  11/2010 Alasaarela et al.
(Continued)

FOREIGN PATENT DOCUMENTS

WO  2013154098 A1  10/2013
WO  2017159696 A1  9/2017
WO  2018086980 A1  5/2018

*Primary Examiner* — Andrew J Coughlin
*Assistant Examiner* — Jessica M Apenteng

(57) ABSTRACT

An optical system (10) is disclosed comprising a light mixing rod (20) having an elongate body extending between a light entry window (22) and an opposing light exit window (24), a plurality of solid state lighting elements (30, 30', 30") arranged to couple their respective luminous outputs into the light mixing rod (20) through said light entry window (22), said respective luminous outputs including luminous outputs having different spectral compositions, respectively, and a lenslet plate (40) having an acceptance angle ($\psi,\psi'$) and comprising a first surface (41) comprising a first array of lenslets (42) and a second surface (43) opposing the first surface (41) comprising a second array of lenslets (44), each lenslet of the first array (42) being aligned with a corresponding lenslet of the second array (44), wherein the light mixing rod (20) has an aspect ratio such that some light rays (35) produced by the solid state lighting elements (30, 30', 30") are directly incident on said first surface (41), said directly incident light rays (35) having a maximum angle of incidence ($\Phi$) on said first surface (41) not exceeding said acceptance angle. Also disclosed is a lighting device comprising such an optical system (10).

12 Claims, 5 Drawing Sheets

(51) Int. Cl.
*F21V 7/00* (2006.01)
*F21Y 105/10* (2016.01)
*F21Y 115/10* (2016.01)

(56) References Cited

U.S. PATENT DOCUMENTS

| | | | |
|---|---|---|---|
| 2013/0194811 A1* | 8/2013 | Benitez | G02B 27/0961 |
| | | | 362/311.1 |
| 2016/0069540 A1* | 3/2016 | Kjeldsen | F21S 10/00 |
| | | | 362/232 |
| 2016/0370529 A1 | 12/2016 | Angelini et al. | |
| 2017/0146204 A1* | 5/2017 | Di Trapani | G02B 19/0028 |
| 2017/0318635 A1 | 11/2017 | Dong et al. | |
| 2018/0318033 A1* | 11/2018 | Tesar | G02B 6/0008 |
| 2019/0032886 A1 | 1/2019 | Daicho et al. | |
| 2019/0033511 A1* | 1/2019 | Gobron | G02B 27/0955 |

\* cited by examiner

OPTICAL SYSTEM AND LIGHTING DEVICE

CROSS-REFERENCE TO PRIOR APPLICATIONS

This application is the U.S. National Phase application under 35 U.S.C. §371 of International Application No. PCT/EP2020/050159, filed on Jan. 7, 2020, which claims the benefit of European Patent Application No. 19151787.9, filed on Jan. 15, 2019. These applications are hereby incorporated by reference herein.

FIELD OF THE INVENTION

The present invention relates to an optical system comprising a light mixing rod having an elongate body extending between a light entry window and an opposing light exit window and a plurality of solid state lighting elements arranged to couple their respective luminous outputs into the light mixing rod through said light entry window, said respective luminous outputs including luminous outputs having different spectral compositions respectively.

The present invention further relates to a lighting device comprising such an optical system.

BACKGROUND OF THE INVENTION

Light mixing rods, sometimes also referred to as light pipes, are optically transmissive bodies that can be used to mix incident light of different spectral compositions, e.g. light of different colours, such that the output of such a light mixing rod has an improved spectral homogeneity compared to the light that is coupled into the light mixing rod. For example, a light mixing rod may be used to receive the light of different coloured solid state lighting elements, e.g. red, blue and green LEDs, and to mix the received light in order to produce a luminous output that predominantly has a single colour or is predominantly white. Such mixing is typically achieved by the surface(s) of the light mixing rod extending between its light entry surface and light exit surface reflecting incident light rays travelling through the light mixing rod back into the light mixing rod, through total internal reflection or specular reflection for example. Such reflections mix the light rays of different spectral compositions to produce a luminous output having a homogenized spectral composition. Such light mixing rods may be used in a variety of different application domains, such as for example tuneable accent lighting for retail environments.

Such light mixing rods may be combined with a diffuser at its light exit surface to improve the spectral homogeneity of the luminous output of such an optical system, e.g. to reduce or eradicate colour separation in the luminous output of the optical system. Where the lightpipe is present, it is disposed between the source module and the optical engine. However, where the optical system comprises a large diversity of luminous inputs from the solid state lighting elements in terms of spectral composition, it has been found that the light mixing properties of such an optical system are unsatisfactory.

This problem is addressed in US 2010/0284201 A1, which discloses an optical system having a source module comprising a non-uniform extended source such as an RGB-LED, an optical engine and at least one of a lightpipe and a lenslet array arrangement. In the embodiments comprising the lightpipe, the lightpipe is dimensioned such that the lightpipe produces a spatially uniform light distribution, after which a diffuser and the optical engine, e.g. a collimator, reduce the angular distribution of this luminous output. However, there exists a need to further reduce the overall size of such an optical system.

SUMMARY OF THE INVENTION

The present invention seeks to provide a more compact optical system including a light mixing rod having an elongate body extending between a light entry window and an opposing light exit window and a plurality of solid state lighting elements arranged to couple their respective luminous outputs into the light mixing rod through said light entry window, said respective luminous outputs including luminous outputs having different spectral compositions respectively that exhibits desirable mixing capabilities for the luminous outputs having different spectral compositions.

The present invention further seeks to provide a lighting device comprising such an optical system.

According to an aspect, there is provided an optical system comprising a light mixing rod having an elongate body extending between a light entry window and an opposing light exit window; a plurality of solid state lighting elements arranged to couple their respective luminous outputs into the light mixing rod through said light entry window, said respective luminous outputs including luminous outputs having different spectral composition respectively; and a lenslet plate having an acceptance angle ($\psi$, $\psi'$) and comprising a first surface comprising a first array of lenslets and a second surface opposing the first surface comprising a second array of lenslets, each lenslet of the first array being aligned with a corresponding lenslet of the second array, wherein the elongate body has a length L, wherein L≥(w+d)/2*tan($\psi$) for a hollow elongate body and L≥(w+d)/2*tan(a sin(sin($\psi$)/n)) for a solid elongate body made of a material having refractive index n, and wherein the lenslet plate (40) is made of a material having a refractive index n, and the lenslets (42, 44) of each array define a cap of a virtual sphere (142) with radius R, said cap having a perimeter lying in a virtual plane (141, 143) of said array, said perimeter defining a directrix of a virtual cone (146) having its apex in the centre (144) of said virtual sphere and having a cone angle α, wherein:

$$\psi = \arcsin\left[n^*\sin\left[\arctan\left[\frac{1}{\tan\left(\arcsin\left(\frac{\sin\alpha}{n}\right) + \frac{\pi}{2} - \alpha\right)}\right]\right]\right],$$

and wherein the first surface of the lenslet plate contacts said light exit window.

Hence, typically the light mixing rod has an aspect ratio such that some light rays produced by the solid state lighting elements are directly incident of said first surface, said directly incident light rays having a maximum angle of incidence ($\phi$) on said first surface not exceeding said acceptance angle.

The present invention is based on the insight that the inability of existing optical systems to effectively mix the different spectral components of such solid state lighting (SSL) elements is caused by light rays emitted by these SSL elements that travel through the light mixing rod without being reflected by the one or more sidewalls of the light mixing rod, i.e. light rays that are directly incident on the light exit surface (the light exit window) of the light mixing rod when the light mixing rod has an insufficient aspect ratio, i.e. when the ratio between the (elongation) length and the width of the light mixing rod is insufficient, to ensure that all emitted rays by the SSL elements are incident on the sidewall(s) of the light mixing rod. Where such light rays are spatially separated from each other, which typically is the case for an extended source, that is, when the SSL elements are spatially distributed across the light entry window of the light mixing rod, the diffuser in existing optical systems cannot effectively mix these different light rays if the aspect ratio of the light mixing rod is insufficient. This leads to inhomogeneities such as colour separation in the luminous outputs of such optical systems, which is undesirable.

This problem has been addressed in embodiments of the present invention by the provision of a lenslet plate carrying lenslet arrays on opposing surfaces, in which the lenslets of opposing arrays are aligned such that the lenslet plate acts as a Kohler integrator. Such a lenslet plate may be dimensioned as a function of the maximum angle under which such unreflected light rays are incident on the light entry surface of the lenslet plate in order to provide a lenslet plate that can effectively mix such directly incident light rays. To this end, the first surface of the lenslet plate contacts with its first array of lenslets said light exit window. Thus an optical system comprising a combination is formed of a mixing rod contacting with its light exit window the first array of lenslets on the first, light entry surface of a Kohler integrator. In such an optical system, the aspect ratio of the light mixing rod may be reduced as complete mixing of the various spectral components in the respective luminous outputs of the SSL elements by the light mixing rod in isolation is no longer required, thereby reducing the overall size of such an optical system.

In the context of the present application, the terms 'acceptance angle' and integration angle' are used interchangeably. As will be readily understood by the skilled person, where reference is made to the acceptance angle of the lenslet array, this term is meant to express the behaviour of the lenslet plate as a whole, e.g. in case of identical lenslet pairs all having the same acceptance angle, in which case the individual acceptance angles equate to the acceptance angle of the lenslet plate, as well as in the case of overlapping lenslet pairs, in which the acceptance angle of the lenslet plate is some numerical average of the acceptance angles of the individual lenslet pairs. In other words, light rays entering the lenslet plate under an angle not exceeding the acceptance angle of the lenslet plate are effectively spatially mixed by the lenslet plate, whereas light rays entering the lenslet plate under an angle exceeding the acceptance angle of the lenslet plate are transmitted by the lenslet plate but not effectively spatially mixed, thereby leading to spatial artefacts such as colour separation artefacts in a beam profile of a light beam produced by the optical system.

In an embodiment, the lenslets in each array are arranged in a Fermat spiral pattern as with such a lenslet arrangement a good (radial) uniformity of the luminous output of the optical system is achieved.

Each array preferably consists of overlapping lenslets such that the lenslet arrays do not comprise areas in between lenslets that need to be made opaque to avoid the creation of artefacts in the luminous output of the optical system caused by light rays incident on such areas and travelling through the lenslet plate.

The elongate body may be made of an optically transmissive material selected from an optically transmissive polymer or glass or may be a hollow body comprising at least one inner surface, wherein the at least one inner surface is specularly reflective. The advantage of using such a solid light mixing rod made of an optically transmissive material is that the optical efficiency of the optical system is improved, but it requires a longer light mixing rod compared to a hollow light mixing rod, such that the latter embodiment of the light mixing rod may be preferably in optical systems that need to be particularly compact.

The at least one inner surface of such a hollow bodied light mixing rod may carry a plurality of facets or a plurality of ripples for further improve the efficiency of the mixing of light rays that are reflected of such inner surface(s). Preferably, the light mixing rod has an elongate body has a length L defining the distance between the light entry window and the second transmissive surface, wherein $L \geq (w+d)/2 * \tan(\psi)$ for a hollow elongate body and $L \geq (w+d)/2 * \tan(a \sin(\sin(\psi)/n))$ for a solid elongate body made of a material having refractive index n, in which w is the length of a maximum cross-section of the light entry window, d is the length of a maximum cross-section of the light exit window and $\psi$ is the acceptance angle of the lenslet plate. This ensures that the light mixing rod has the appropriate aspect ratio such that the lenslet plate with a given acceptance or integration angle can effectively mix all light rays directly travelling through the light mixing rod having such an aspect ratio. For a light mixing rod having a constant cross-section across its full length, w=d, such that these equation may be simplified to $L \geq w/\tan(\psi)$ for a hollow light mixing rod and to $L \geq w)/\tan(a \sin(\sin(\psi)/n))$ for a solid light mixing rod.

In an example embodiment, the lenslet plate may be made of a material having a refractive index n, and the lenslets of each array may define a cap of a virtual sphere with radius R, said cap having a perimeter lying in a virtual plane of said array, said perimeter defining a directrix of a virtual cone having its apex in the center of said sphere and having a cone angle $\alpha$, wherein:

$$\psi = \arcsin\left[n^*\sin\left[\arctan\left[\frac{1}{\tan\left(\arcsin\left(\frac{\sin \alpha}{n}\right) + \frac{\pi}{2} - \alpha\right)}\right]\right]\right],$$

which can be written in a simpler form as:

$\psi = \arcsin(n^*\sin(\alpha - \arcsin((\sin \alpha)/n)))$.

This ensures that as long as the light mixing rod obeys the aforementioned minimum length requirement, all light rays directly incident on the lenslet array can be effectively mixed by it. This furthermore may imply that the respective virtual planes are to be separated by a distance v, in which:

$$v = R^*\sin \alpha^* \tan\left(\arcsin\left(\frac{\sin \alpha}{n}\right) + \frac{\pi}{2} - \alpha\right) - R(1 - \cos \alpha).$$

It is further noted that the refractive index of respectively the mixing rod, which may be referred to as n1, and the refractive index of the lenslet plate, which may be referred to as n2, may be mutually different or may be the same.

In an embodiment, the elongate body tapers at an angle $\beta$ outwardly from the light entry window to the light exit window. This has the advantage that the optical efficiency of the light mixing rod can be improved and/or to create a more narrow light beam exiting from the light mixing rod. In particular the taper angle is in a range from $0 < \beta \leq 0.5*\phi$ as then an acceptable aspect ratio of the light mixing rod is maintained.

The elongate body may have any suitable cross-sectional shape perpendicular to its elongation direction, such as a circular shape or a polygonal shape. However, in at least some embodiments, the elongate body has a square or hexagonal cross-section perpendicular to its elongation direction as such cross-sectional shapes are particularly effective for light mixing.

The plurality of solid state lighting elements may comprise different sets of individually addressable solid state lighting elements, each set comprising at least one solid state lighting element. This for example may be used to control the spectral composition of the luminous output of the optical system, e.g to tune a colour or colour temperature of this luminous output. For example, each set consists of solid state lighting elements producing a luminous output having the same spectral composition, such as a set of red light producing SSL elements, a set of green light producing SSL elements and a set of blue light producing SSL elements. Of course other combinations of SSL elements are equally feasible.

In an embodiment, the optical system further comprises a collimator (such as a total internal reflection collimator) optically coupled to the second surface of the lenslet plate for collimating a luminous output of said lenslet plate. The presence of such a collimator may assist in producing a particularly narrow beam with the optical system, e.g. a beam having a beam angle ranging from 5-25° when measured at full width half maximum (FWHM), which for example makes the optical system suitable for use in accent lighting, e.g. accent lighting in retail environments.

According to another aspect, there is provided a lighting device comprising a housing containing the optical system of any of the herein described embodiments. Due to the compact nature of the optical system, such a lighting device, e.g. a spotlight or the like, benefits from optionally being compact whilst at the same time achieving excellent uniformity in terms of spectral composition, e.g. colour uniformity, of the light beam produced with such a lighting device.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
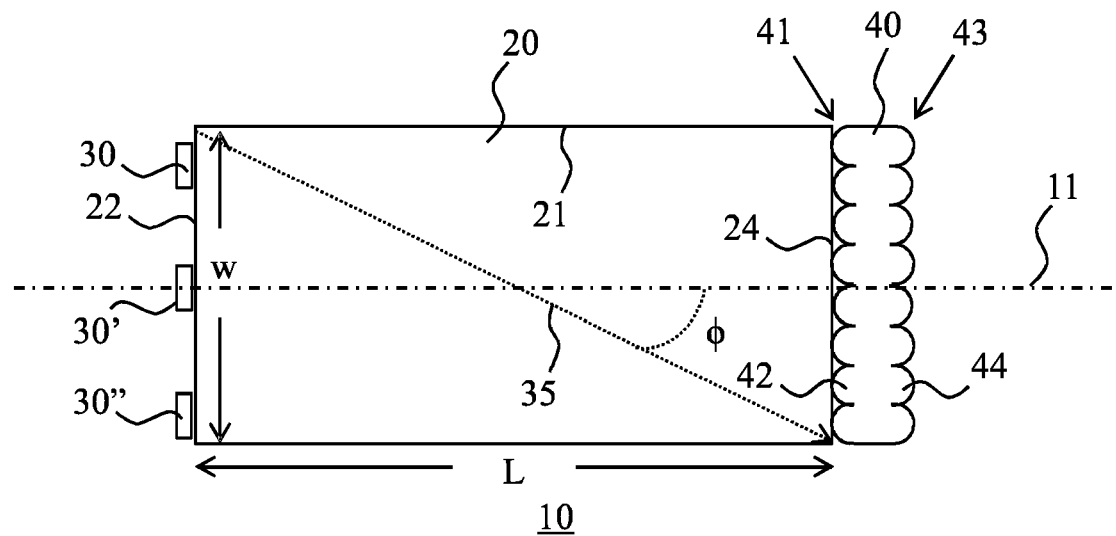
FIG. 1 schematically depicts a cross-sectional view of an optical system according to an embodiment.

It should be understood that the Figures are merely schematic and are not drawn to scale. It should also be understood that the same reference numerals are used throughout the Figures to indicate the same or similar parts.

FIG. 1 schematically depicts a cross-sectional view of an optical system 10 according to an embodiment of the present invention. The optical system 10 comprises a light mixing rod 20 having an elongated body extending between a light entry window 22 having a maximum cross-section w and a light exit window 24. In the context of the present application, where reference is made to the maximum cross-section of a surface, this is meant to define the largest linear distance across such a surface. For example, for a circular surface this is the diameter of the circle, for a rectangular surface this is the major diagonal across such a surface and so on. Moreover, where reference is made to a window, this is to be understood as any feature that allows light to pass, such as an opening or aperture or a light transmissive surface. The light mixing rod 20 has a length L defined as the linear distance between the light entry window 22 and the light exit window 24.

The light mixing rod 20 may be a hollow structure, e.g. a metal rod or the like in which the one or more inner surfaces 21 are reflective, e.g. specularly reflective. For example, the one or more inner surfaces 21 may act as a mirror that reflects incident light back into the light mixing rod 20. Of course, such one or more inner surfaces 21 may be made reflective in any suitable manner, e.g. using paint, coatings and the like. Where the light mixing rod 20 is hollow, it will be understood that the light entry window 22 and the light exit window 24 of such a light mixing rod may be openings rather than material surfaces.

Alternatively, the light mixing rod 20 may comprise a solid body made of an optically transmissive material such as glass or optical grade polymer such as polycarbonate, silicone, poly (methyl methacrylate) or the like. In such embodiments, light rays travelling through the light mixing rod 20 that are incident on the interface of the light mixing rod 20 with its surrounding medium, e.g. air, are reflected back into the light mixing rod 20 by total internal reflection. As this principle is well-known per se, this is not explained in further detail for the sake of brevity only.

The light mixing rod 20 may have any suitable cross-sectional shape (for a cross section of the light mixing rod 20 perpendicular to the optical axis of the optical system 10). For example, the light mixing rod 20 may have a circular cross-sectional shape or a polygonal cross-sectional shape. In preferred embodiments, the light mixing rod 20 has a rectangular (e.g. square) or hexagonal cross-sectional shape as light mixing rods having such cross-sectional shapes achieve particularly effective mixing of light travelling through such a light mixing rod. However, it is noted for the avoidance of doubt that the light mixing rod 20 may have any suitable (cross-sectional) shape, including continually changing shapes in the elongation direction of the light mixing rod 20, for example when its light entry window 22 and its light exit window 24 have different shapes, such as a circular shape and a rectangular shape respectively by way of non-limiting example.

The light entry window 22 of the light mixing rod 20 acts as the light entry surface of the light mixing rod 20, whilst the light exit window 24 opposing the light entry window 22 acts as the light exit surface of the light mixing rod 20. Along the light entry window 22 a plurality of solid state lighting (SSL) elements 30, 30', 30" are arranged such that the majority of light of the respective luminous outputs of these SSL elements is coupled into the light mixing rod 20 through its light entry window 22. For example, the respective SSL elements 30, 30', 30" may be aligned with, e.g. mounted on, the light entry window 22. The SSL elements 30, 30', 30" include SSL elements producing respective luminous outputs having different spectral compositions. For example, a set of SSL elements 30 may include one or more red light producing LEDs, a set of SSL elements 30' may include one or more green light producing LEDs and a set of SSL elements 30" may include one or more red light producing LEDs such that by individual control of the sets or even the SSL elements within each set the spectral composition of the luminous output of the optical system 10 may be tuned. For example, in this manner the optical system 10 may be controlled to produce a luminous output with a tunable colour or colour temperature, which may be desirable in a wide variety of application domains such as for example accent lighting in retail environments. Of course, other application domains, such as for example accent lighting in other environments such as a home environment, will be immediately apparent to the skilled person.

The SSL elements 30, 30', 30" may be distributed across the light entry window 22 of the light mixing rod 20 in any suitable manner, such as for example in a regular or random pattern. Where such SSL elements include red, green and blue LEDs, such LEDs may be present in a particular ratio, e.g. R(x), G(y), B(z), in which RGB represent red, green and blue LEDs respectively and x, y and z represent the ratios of such LEDs. For example, R(3), G(2), B(2) denotes a SSL arrangement comprising RGB LEDs in a ratio 3:3:2 whereas R(2), G(3), B(1) denotes a SSL arrangement comprising RGB LEDs in a ratio 2:3:1. Such ratios are typically based on the respective luminous flux of such LEDs in order to ensure that the optical system 10 can produce luminous outputs having a desirable spectral composition, e.g. white light having a particular colour temperature. Any combination of SSL elements may be used in the optical system 10 according to embodiments of the present invention, such as for example a combination of large and small LEDs. In some applications it further may be advantageous to combine a white light-emitting SSL arrangement such as a COB (chip on board) having a diameter in a range of 6-32 mm with an array of RGB LEDs, e.g. mini LEDs having sizes in a range 0.1-0.3 mm approximately.

Figure 2:
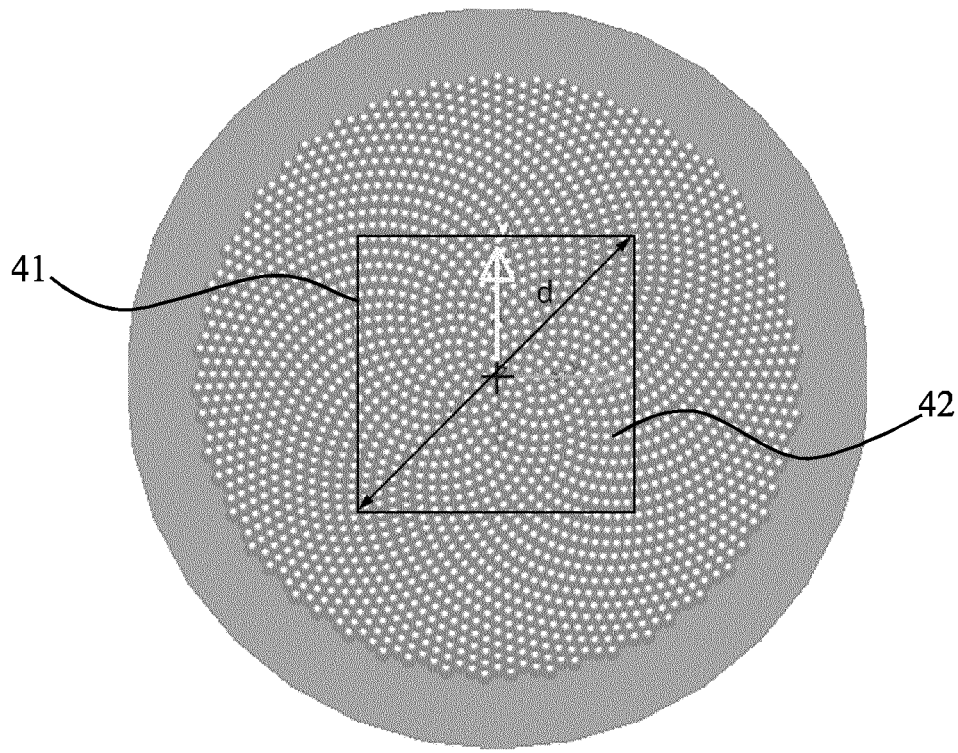
FIG. 2 schematically depicts a face-on view of a lenslet arrangement of an optical system according to an embodiment.

The optical system 10 further comprises a lenslet plate 40 comprising a first surface 41 carrying a first array of lenslets 42 and a second surface 43 opposing the first surface 41 carrying a second array of lenslets 44. The shape and area of the lenslet plate 40 typically matches that of the light exit window 24 of the light mixing rod 20. Such a lenslet plate 40 typically acts as a Kohler integrator, i.e. the lenslets 42 and 44 are identical and in perfect alignment with each other. FIG. 2 schematically depicts a front view of a preferred embodiment of such a lenslet arrangement, in which the lenslets 42 (and 44) are arranged in a Fermat spiral pattern (also referred to as a phyllotaxis pattern). An array of lenslets arranged in such a pattern has the advantage that good (radial) uniformity is achieved in the spatial distribution of the luminous output of the lenslet plate 40. Of course, other patterns for such arrays of lenslets 42, 44 may be contemplated. Light emitted by the light mixing rod 20 through its light exit window (the light exit window 24) is directly coupled into the lenslet plate 40. For this reason, it is preferred that the first surface 41 of the lenslet plate 40 contacts the light exit window 24 of the light mixing rod 20, although this is not essential; a small air gap may be present between these surfaces instead.

In accordance with embodiments of the present invention, the aspect ratio of the light mixing rod 20 of the optical system 10 is such that a portion of the light rays emitted into the light mixing rod 20 by the SSL elements 30, 30', 30" is directly incident on the first surface 41 of the lenslet plate 40. The light mixing rod 20 has a length L defined as the linear distance between the light entry window 22 and the light exit window 24. An aspect ratio of the light mixing rod 20 may be defined as L/d' in which d' is the length of the maximum cross-section of the light exit window 24, with L>d' (thereby yielding an elongated light mixing rod 20). Where the dimensions of the lenslet plate 40 match those of the light exit window 24, d=d'. It will be understood that the dimensions of the lenslet plate are such that the entirety of the light exit window 24 is covered by the lenslet plate 40. The aspect ratio of the light mixing rod 20 defines the maximum angle of incidence $\phi$ of a light ray 35 directly incident on the first surface 41 as shown in FIG. 1.

Due to the different spectral compositions of at least some of these rays directly incident on the first surface 41, this therefore leads to a non-uniform spatial distribution of the luminous output of the light mixing rod 20. However, the lenslet plate 40 is arranged to effectively mix such light rays directly incident on the light exit window 24 of the light mixing rod 20. To explain this in more detail, an example design of the lenslets 42, 44 will be explained with the aid of FIG. 3, which schematically depicts a cross-sectional view of the lenslet array 40 according to this example embodiment. In such a lenslet array, the acceptance or integration angle $\psi$ of an aligned lenslet pair 42, 44 defines the range of angles of incident light that can be effectively mixed by the lenslet plate 40.

In the context of the present invention, the acceptance angle $\psi$ should be large enough such that for the light rays 35 directly incident on the lenslets 42 under the maximum angle $\phi$ as defined relative to the optical axis 11 of the optical system 10, these rays are effectively mixed by the lenslet plate 40. Light rays may be incident on the lenslet plate 40 under larger angles, but such light rays will have been internally reflected (mixed) within the light mixing rod 20 such that for such light rays the effectiveness of the lenslet plate 40 is less relevant. As explained above, the maximum angle $\phi$ is a direct function of the aspect ratio of the light mixing rod 20. Therefore, for a lenslet plate 40 having a given acceptance angle $\psi$, the aspect ratio of the light mixing rod 20 should be chosen such that the maximum angle $\phi$ does not exceed the critical value beyond which the mixing of the lenslet plate 40 becomes incomplete. Alternatively, for a light mixing rod 20 having a given aspect ratio a lenslet plate 40 should be provided having a large enough acceptance angle $\psi$ to ensure such effective mixing of the light rays directly incident on the light exit window 24 of the light mixing rod 20, although in practice this is less preferable due to the higher costs associated with the design and manufacture of such a lenslet plate compared to the design and manufacture of a light mixing rod tailored to the optical parameters of a given lenslet plate.

Figure 3:
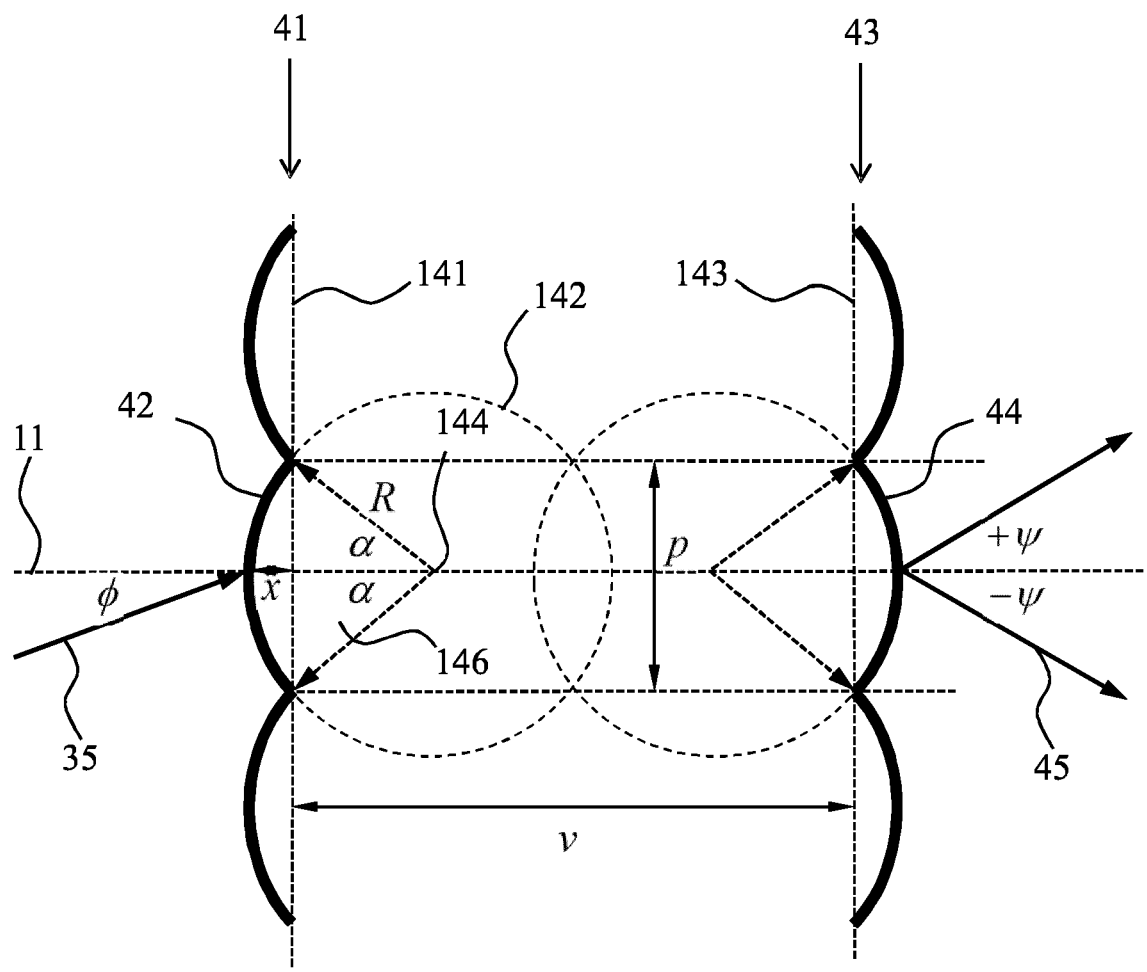
FIGS. 3 and 4 schematically depict a cross-sectional view of a lenslet plate and its optical performance of an optical system according to an embodiment.

In FIG. 3, each lenslet 42 (and 44) is formed as spherical cap of a virtual sphere 142 with radius R. Such a spherical cap defining a lenslet 42 has its perimeter in the virtual plane 141 of the first surface 41 of the lenslet plate 40, whilst a spherical cap defining a lenslet 44 has its perimeter in the virtual plane 143 of the second surface 43 of the lenslet plate 40. The respective spherical caps of the lenslets 42, 44 have a maximum height x relative to the respective virtual planes 141, 143, i.e. in the center of the spherical cap. The virtual planes 141 and 143 are separated from each other by a distance v. The perimeter of each spherical cap defines a directrix with diameter p of a virtual cone 146 having its apex in the center 144 of the virtual sphere 142 such that the virtual cone 146 has a cone angle α defined as the angle between a generatrix (i.e. the sloped surface) of the virtual cone 146 and the optical axis 11 of the optical system 10.

As previously explained, the acceptance angle ψ of a lenslet pair of the lenslet plate 40 defines the range of angles of incident light rays for which the lenslet plate 40 can provide effective mixing. The distance v and the acceptance angle ψ may be expressed as follows:

$$v = R^* \sin \alpha^* \tan\left(\arcsin\left(\frac{\sin \alpha}{n}\right) + \frac{\pi}{2} - \alpha\right) - R(1 - \cos \alpha) \cdot$$

$$\psi = \arcsin\left[n^* \sin\left[\arctan\left[\frac{1}{\tan\left(\arcsin\left(\frac{\sin \alpha}{n}\right) + \frac{\pi}{2} - \alpha\right)}\right]\right]\right],$$

which can be rewritten in a simpler form as:

ψ=arcsin(n*sin(α−arcsin((sin α)/n)))

Figure 4:
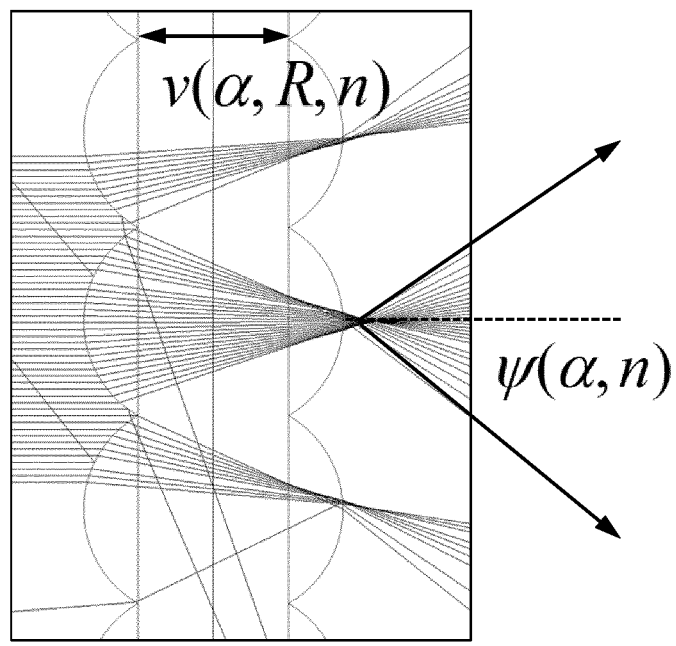

In the above equations, n is the refractive index of the material from which the lenslet plate 40 is made. The optical performance of the lenslet plate 40 and the respective relationships of v and ψ is also symbolically depicted in FIG. 4. Where light rays 35 are incident under an angle ϕ=0°, all light rays 45 transmitted by the lenslet plate 40 will be between −ψ and +ψ. However, as soon as |ϕ|>|ψ|, the light rays 45 transmitted by the lenslet plate 40 will not be sufficiently mixed. Consequently, to ensure that all light rays 35 that are directly incident on the light exit window 24 of the light mixing rod 20 (and therefore on the first surface 41 of the lenslet plate 40), the light mixing rod 20 should have a minimum length L. For example, for a hollow light mixing rod 20, the minimum length L may be defined as follows:

$$L \geq \frac{w}{\tan(\psi)}$$

This equation demonstrates how the minimum length, or more precisely, the minimum aspect ratio of the light mixing rod 20 is a function of the acceptance angle of the lenslet plate 40 and the maximum cross-section of the light entry surface, i.e. the light entry window 22, of the light mixing rod 20. It is noted that this equation is valid for hollow light mixing rods having a constant cross-sectional dimension along the elongation direction of the light mixing rod, i.e. the light entry window 22 and the light exit window 24 of the light mixing rod 20 have the same shape and area. It will be explained in further detail below how this equation may be generalised for other shapes of light mixing rods, e.g. tapered hollow light mixing rods.

For a solid light mixing rod 20 made of a material with refractive index n, the above formula becomes:

$$L \geq \frac{w}{\tan(a \sin(\sin (\psi)/n))}$$

Hence, where a hollow or solid light mixing rod 20 obeys its aforementioned relationship of L, light produced by the SSL elements 30, 30', 30" is mixed by two processes: light rays that are directly incident on the lenslet plate 40 are effectively made spatially uniform (e.g. colour uniform) by the lenslet plate 40, whereas light rays that are directly incident on the lenslet plate 40 are made spatially uniform by multiple reflections with the one or more sidewalls 24 of the light mixing rod 20, which light is subsequently scattered under a wide range of angles by the lenslet plate 40.

In the foregoing example embodiment of the lenslet plate 40, the lenslets 42 and 44 are depicted as non-overlapping lenslets such that gaps will be present in between neighboring lenslets. In such an embodiment, the effective integration angle of the lenslet plate 40 equals that of its individual lenslet pairs. In order to prevent light incident on the lenslet plate 40 from entering the lenslet plate through such gaps, an opaque material, e.g. black paint or the like, may be applied to these gaps. However, in a preferred embodiment such gaps are omitted altogether by providing arrays of overlapping lenslets 42 and 44, for example by arranging such lenslets in a Fermat spiral type of configuration. The Cartesian (x, y) coordinates of p lenses (in which p is a positive integer) in such a configuration may be defined as:

$$x = c^* \sqrt{p}^* \cos(p^* 180^* (3 - \sqrt{5}))$$

$$y = c^* \sqrt{p}^* \sin(p^* 180^* (3 - \sqrt{5}))$$

In these equations, c is a design parameter that controls the amount of overlap between the lenslets in such an array and thereby controls whether any open spaces exist in between the lenslets. In case of such an overlapping lenslet arrangement, the acceptance angle ψ of the lenslet plate 40 reduces to ψ* such that the minimum length L of a hollow light mixing rod 20 becomes:

$$L \geq \frac{w}{\tan(\psi^*)}$$

Similarly, the minimum length of a solid light mixing rod 20 made of a material with refractive index n becomes:

$$L \geq \frac{w}{\tan(a \sin(\sin (\psi^*)/n))}$$

Due to the different degrees of overlap between the lenslets 42, 44 in such configurations, the reduced or effective acceptance angle ψ* typically can only be obtained numerically.

Figure 5:
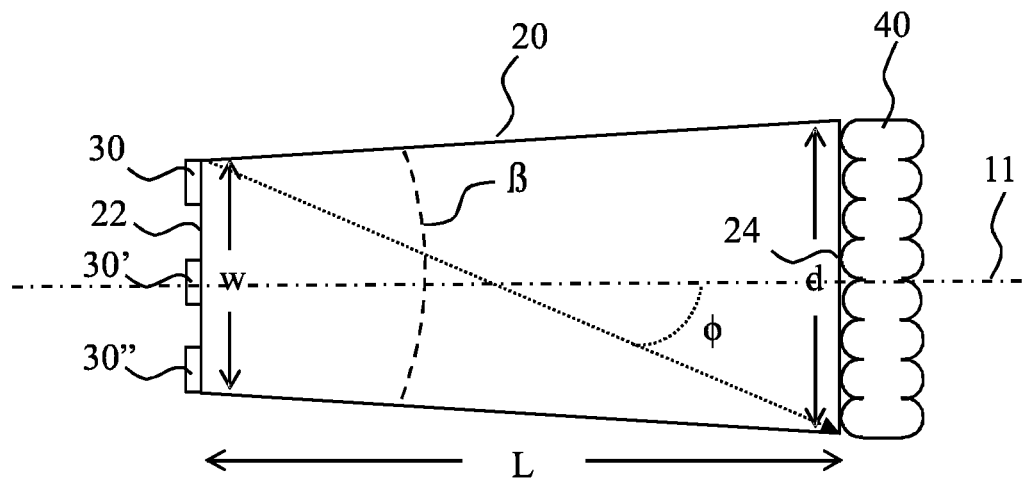
FIG. 5 schematically depicts a cross-sectional view of an optical system according to another embodiment.

FIG. 5 schematically depicts a cross-sectional view of an optical system 10 according to another embodiment. In this embodiment, the light mixing rod 20 tapers by angle β of about ⅓*ϕ outwardly from the light entry window 22 towards the light exit window 24 such that the light exit window 24 has a larger area than the light entry window 22. Such a tapered light mixing rod 20 may be used to increase the optical efficiency and/or to create a narrower light beam (cut-off). In this embodiment, the light entry window 22 has a maximum cross-section w and the light exit window 24 has a maximum cross-section d (e.g. matching that of the lenslet plate 40), such that the minimum length L of a hollow light mixing rod 20 as a function of the (reduced) acceptance angle ψ may be defined as:

$$L \geq \frac{w + d}{2^* \tan(\psi)}$$

For a solid light mixing rod 20 made of a material having refractive index n, this becomes:

$$L \geq \frac{w+d}{2^*\tan(a\sin(\sin(\psi)/n))}$$

Of course, in these formulae ψ becomes ψ* in case of a lenslet plate 40 having overlapping lenslet pairs 42, 44 as explained above.

Figure 6:
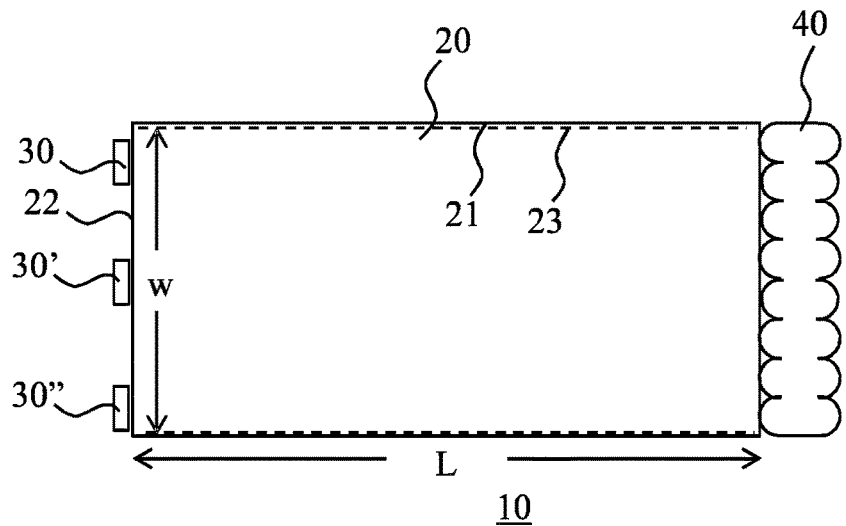
FIG. 6 schematically depicts a cross-sectional view of an optical system according to yet another embodiment.

FIG. 6 schematically depicts a cross-sectional view of an optical system 10 according to yet another embodiment. In this embodiment, the light mixing rod 20 is a hollow light mixing rod comprising a plurality of structures 23 such as facets or ripples on its one or more inner surfaces 23 to increase scattering of incident light rays to increase the efficiency of the mixing of such light rays within the light mixing rod 20. At this point it is noted that a hollow light mixing rod is less efficient than a solid light mixing rod made of an optically transmissive material such as glass or a polymer, but has the advantage of requiring a shorter length L for effectively mixing the internally reflected light rays travelling through such a light mixing rod 20. Therefore, the use of such a hollow light mixing rod may be preferred in embodiments in which the overall length of the optical system 10 must be reduced as much as possible in order to provide a particularly compact optical system.

Figure 7:
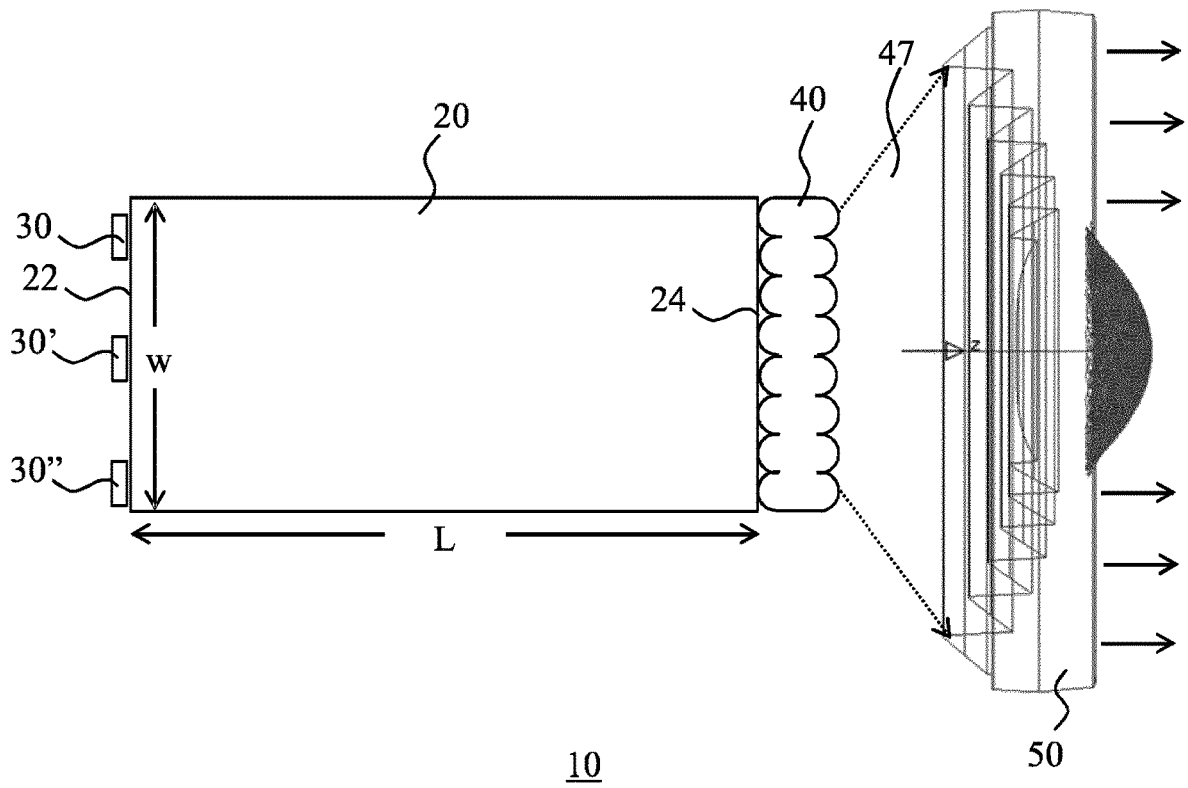
FIG. 7 schematically depicts a cross-sectional view of an optical system according to yet another embodiment.

In the aforementioned embodiments of the optical system 10, the optical system has been described comprising SSL elements 30, 30', 30", the light mixing rod 20 and the lenslet plate 40 acting as a Kohler integrator. However, it should be understood that in any of these embodiments, further optical components may be added to the optical system 10 without departing from the teachings of the present application. For example, as schematically depicted in FIG. 7, a collimator 50 may be added to the optical system 10 such that the collimator 50 is (directly) optically coupled to the second surface of the lenslet plate 40 for collimating the luminous output 47 (including light rays 45) of the lenslet plate 40. Such a collimator 50 may be used to create a narrow light beam with the optical system 10, e.g. a light beam having a beam angle in the range of 5-25° at FWHM of the beam profile. Such a collimator 50 may take any suitable shape. For example, the collimator 50 may be a total internal reflector collimator such as a Fresnel lens, as such collimators are particularly compact and therefore contribute to minimizing the overall length (thickness) of the optical system 10. It should be understood that other type of optical components may be added to the optical system 10 without departing from the teachings of the present invention.

Figure 8:
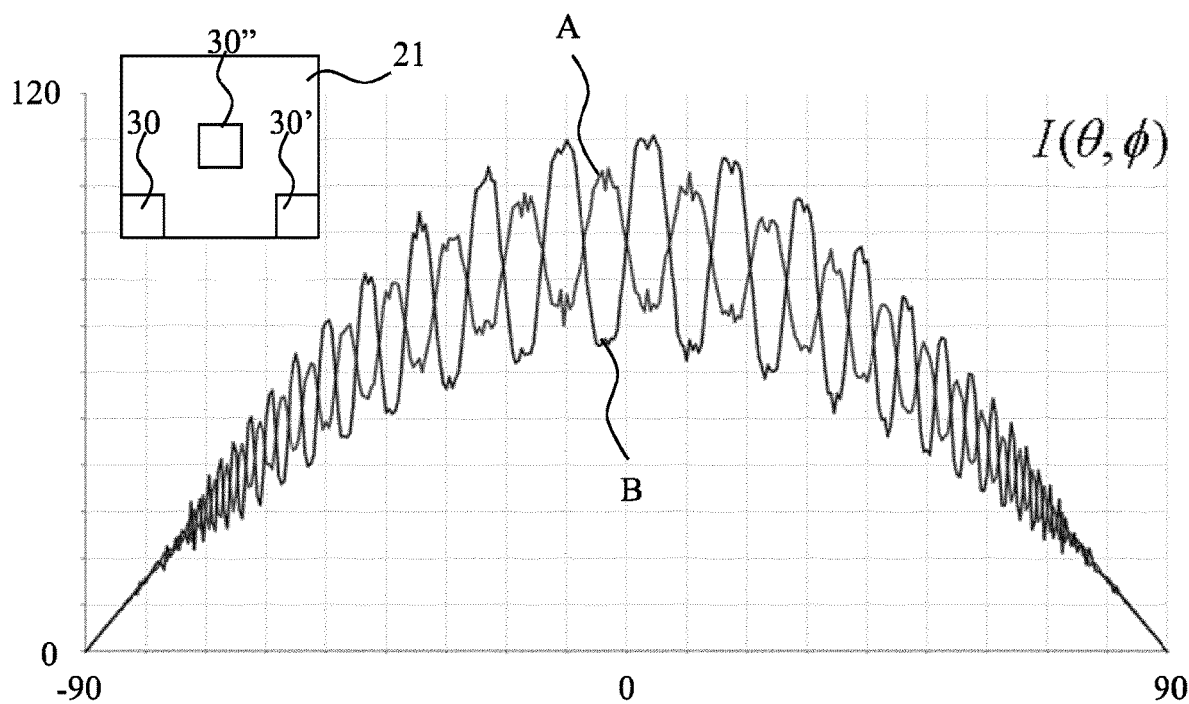
FIG. 8 is a graph depicting an optical performance of a light mixing rod with a particular aspect ratio in the absence of a lenslet plate at its light exit surface.

FIG. 8 depicts a plot of intensity (y-axis) as a function of viewing angle (x-axis) of components A and B of a luminous output produced along orthogonal axes of a virtual plane coinciding with the light exit window of a hollow light mixing rod 20 having a square cross-section of 2×2 mm and reflective inner surfaces, and a length L of 16 mm without the use of a lenslet plate 40. In the inset, on the light entry window 21 of the light missing rod 20, the SSL elements 30, 30' and 30" are spatially arranged as shown, with a red LED 30, a blue LED 30' and a green LED 30", each measuring 0.5×0.5 mm. The red LED has a luminous flux of 54 lm, a peak wavelength of 619 nm and a Gaussian FWHM of 18.8 nm. The green LED has a luminous flux of 209 lm, a peak wavelength of 556 nm and a Gaussian FWHM of 18.8 nm. The blue LED has a luminous flux of 14 lm, a peak wavelength of 468 nm and a Gaussian FWHM of 18.8 nm, such that the luminous outputs of these LEDs (when fully mixed) combine to yield white light with a colour temperature of about 5,000 K. Although this optical system yielded an illuminance E (x,y) at the light exit window of the light mixing rod that was perfectly uniform, it can be seen from FIG. 8 that the luminous output showed a strong angle dependency for its intensity caused by spatial separation of the various spectral compositions of this luminous output, which led to noticeable colour artefacts therein, as also confirmed by evaluation of the colour difference Δu'v' as a function of relative intensity of the beam emitted by this optical system.

Figure 9:
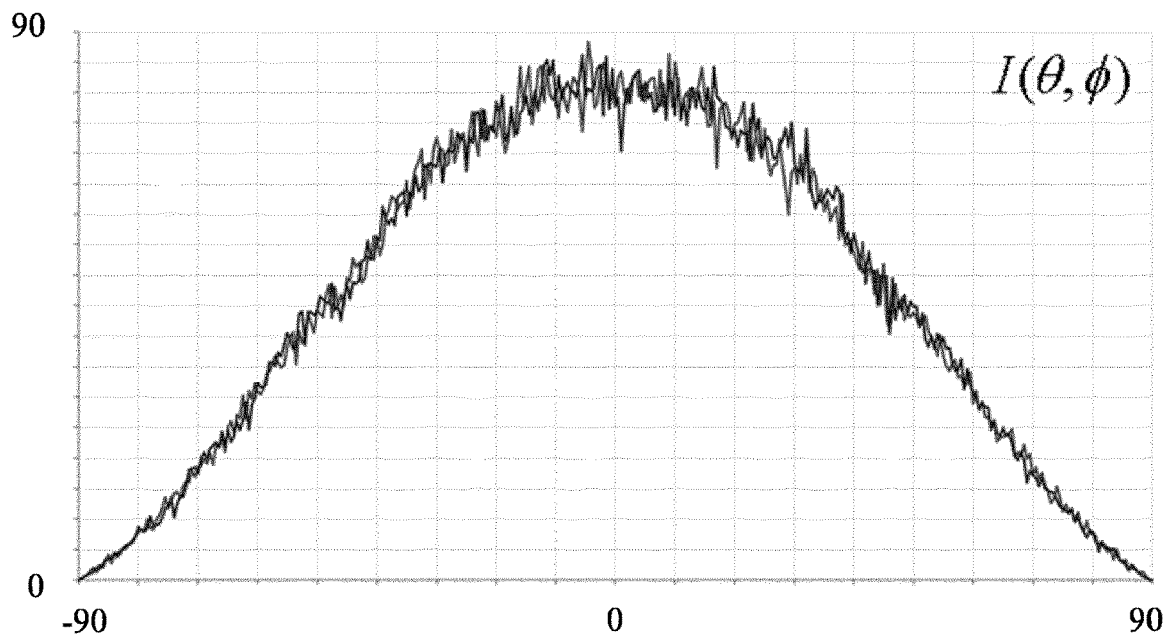
FIG. 9 a graph depicting an optical performance of the light mixing rod of FIG. 9 when forming part of an optical system according to an embodiment.

FIG. 9 depicts a plot of intensity (y-axis) as a function of viewing angle (x-axis) of the same components A and B of a luminous output produced with an optical system according to an example embodiment of the present invention including the hollow light mixing rod 20 and SSL element arrangement as described in the detailed description of FIG. 8, and a lenslet plate 40 as described in more detail above having lenslets 42, 44 in a Fermat spiral configuration in which p=2,000, c=0.45, α=33.5°, R=1 mm, v=2.45 mm, ψ=18.0°, and n=1.50. For ψ* a value of 10° was estimated, what resulted in L=16 mm. As can be seen, the components A and B along orthogonal axes of a virtual plane coinciding with the light exit surface 43 of the lenslet array are now (nearly) indistinguishable, i.e. (nearly) independent of viewing angle, whilst the intensity distribution is smooth and approximating a Lambertian distribution. When evaluating the colour difference Δu'v' as a function of relative intensity of the beam emitted by this optical system, no visible colour effects were present in the relative intensity range from 1 to 0.01 for this beam.

As will be clear from the foregoing, when increasing the effective acceptance angle ψ* of the lenslet plate 40, the aspect ratio of the light mixing rod 20 may be further reduced. For example, in the example embodiment described in FIG. 9, by increasing the individual lenslet pair integration angle ψ to 40.0° (in which case ψ* is estimated to be 20°), the length of the light mixing rod 20 (when not altering its maximum diameter) can be reduced to 7.8 mm. This was confirmed using such a hollow light mixing rod in which its length was reduced to 8.0 mm, which again showed no spatial separation in the luminous output of this optical system.

Such an optical system 10 according to embodiments of the present invention for example may be used in lighting devices, in which the optical system 10 may be housed within the housing of such a lighting device, e.g. a spot light or the like. Such a lighting device for example may be used to provide colour-tuneable accent lighting, such as in a retail environment for example.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An optical system comprising:
a light mixing rod having an elongate body with a length L and straight sidewalls and extending between a light entry window having a maximum entry cross-section w and an opposing light exit window having a maximum exit cross-section d;
a plurality of solid state lighting elements arranged to couple their respective luminous outputs into the light mixing rod through said light entry window, said respective luminous outputs including luminous outputs having different spectral compositions respectively; and
a lenslet plate having an acceptance angle ($\psi$, $\psi'$) and comprising a first surface comprising a first array of lenslets and a second surface opposing the first surface comprising a second array of lenslets, each lenslet of the first array being aligned with a corresponding lenslet of the second array,
wherein the elongate body has a length L, wherein L≥(w+d)/2*tan($\psi$) for a hollow elongate body and L≥(w+d)/2*tan(a sin(sin($\psi$)/n)) for a solid elongate body made of a material having refractive index n, and
wherein the lenslet plate is made of a material having a refractive index n, and the lenslets of each array define a cap of a virtual sphere with radius R, said cap having a perimeter lying in a virtual plane of said array, said perimeter defining a directrix of a virtual cone having its apex in the centre of said virtual sphere and having a cone angle $\alpha$, wherein:

$$\psi = \arcsin\left[n^*\sin\left[\arctan\left[\frac{1}{\tan\left(\arcsin\left(\frac{\sin\alpha}{n}\right) + \frac{\pi}{2} - \alpha\right)}\right]\right]\right],$$

and wherein the first surface of the lenslet plate contacts said light exit window.

2. The optical system of claim 1, wherein the lenslets in each array are arranged in a Fermat spiral pattern.

3. The optical system of claim 1, wherein each array consists of overlapping lenslets.

4. The optical system of claim 1, wherein:
the elongate body is made of an optically transmissive material selected from an optically transmissive polymer or glass; or
the elongate body is a hollow body comprising at least one inner surface, wherein the at least one inner surface is specularly reflective.

5. The optical system of claim 4, wherein the at least one inner surface carries a plurality of facets or ripples.

6. The optical system of claim 1, wherein the respective virtual planes are separated by a distance v, in which:

$$v = R^*\sin\alpha^*\tan\left(\arcsin\left(\frac{\sin\alpha}{n}\right) + \frac{\pi}{2} - \alpha\right) - R(1 - \cos\alpha).$$

7. The optical system of claim 1, wherein the elongate body tapers outwardly from the light entry window to the light exit window.

8. The optical system of claim 1, wherein the elongate body has a square or hexagonal cross-section.

9. The optical system of claim 1, wherein the plurality of solid state lighting elements comprises different sets of individually addressable solid state lighting elements, each set comprising at least one solid state lighting element.

10. The optical system of claim 9, wherein each set consists of solid state lighting elements producing a luminous output having the same spectral composition.

11. The optical system of claim 1, further comprising a collimator optically coupled to the second surface of the lenslet plate for collimating a luminous output of said lenslet plate.

12. A lighting device comprising a housing containing the optical system of claim 1.

* * * * *